United States Patent
Kim et al.

(10) Patent No.: US 7,606,293 B2
(45) Date of Patent: Oct. 20, 2009

(54) BIDIRECTIONAL TURBO ISI CANCELLER-BASED DSSS RECEIVER FOR HIGH-SPEED WIRELESS LAN

(75) Inventors: Byoung-Hoon Kim, Seoul (KR); Suwon Kang, Seoul (KR); Bong Youl Cho, Seoul (KR); Kyeongho Lee, Seoul (KR)

(73) Assignee: GCT Semiconductor, Inc., San Jose, CA (US)

( * ) Notice: Subject to any disclaimer, the term of this patent is extended or adjusted under 35 U.S.C. 154(b) by 908 days.

(21) Appl. No.: 10/690,629

(22) Filed: Oct. 23, 2003

(65) Prior Publication Data

US 2004/0131109 A1 Jul. 8, 2004

Related U.S. Application Data (60) Provisional application No. 60/421,056, filed on Oct. 25, 2002.

(51) Int. Cl.
*H04B 1/00* (2006.01)
(52) U.S. Cl. .................. 375/148; 375/229; 375/232; 375/233; 375/346; 375/348; 375/350
(58) Field of Classification Search ............... 375/130, 375/148, 152, 229–236, 346–350
See application file for complete search history.

(56) References Cited

U.S. PATENT DOCUMENTS 5,056,117 A * 10/1991 Gitlin et al. ............. 375/234

| | | | |
|---|---|---|---|
| 6,031,866 A * | 2/2000 | Oler et al. | 375/219 |
| 6,223,273 B1 | 4/2001 | Kanekawa et al. | |
| 6,546,041 B1 | 4/2003 | Fujimoto | 375/140 |
| 6,647,077 B1 | 11/2003 | Shan et al. | 375/346 |
| 6,678,310 B1 * | 1/2004 | Andren et al. | 375/147 |
| 2002/0131488 A1* | 9/2002 | Allpress et al. | 375/233 |
| 2003/0161421 A1* | 8/2003 | Schmidt et al. | 375/346 |

FOREIGN PATENT DOCUMENTS

EP 1128566 A2 8/2001

OTHER PUBLICATIONS

IEEE Std 802.11b/D8.0, Wireless LAN Medium Access Control (MAC) and Physical Layer (PHY) Specifications: Higher Speed Physical Layer (PHY) Ertension in the 2.4 GHZ hand, Sep. 2001.

* cited by examiner

*Primary Examiner*—Curtis B Odom (57) ABSTRACT

A bidirectional turbo ISI canceller cancels precursor-ISI as well as postcursor-ISI in a received signal without incorporating a multiplicative feedforward equalization filter. This is accomplished by taking a three-step receiver design approach. In the first step, an optimal single-symbol RAKE receiver is designed to comprise a CMF, a codeword correlator bank, and an energy bias (EB) canceller under the assumption that no ISI is generated by preceding or trailing symbols. In a second step, a DFE is included for suppressing postcursor-ISI caused by a preceding symbol. Finally, a precursor ISI canceler is used to remove the remaining ISI caused by a trailing symbol. All three components may be integrated into a BTIC-based receiver applying turbo-iteration processing.

23 Claims, 11 Drawing Sheets

BIDIRECTIONAL TURBO ISI CANCELLER-BASED DSSS RECEIVER FOR HIGH-SPEED WIRELESS LAN

This application claims benefit of U.S. Provisional Application Ser. No. 60/421,056 filed Oct. 25, 2002, whose entire disclosure is incorporated herein by reference.

BACKGROUND OF THE INVENTION

1. Field of the Invention

The present invention generally relates to wireless communications, and more particularly to a direct-sequence spread-spectrum (DSSS) packet receiver that iteratively removes precursor inter-symbol interference (ISI) as well as postcursor ISI in wireless multipath channels by employing a bidirectional turbo ISI canceller.

2. Description of the Related Art

DSSS techniques have widely been applied to major wireless communications standards such as IS-95, CDMA 2000, W-CDMA, IEEE 802.11 wireless local area networks (WLAN) as well as others. These DSSS systems have in common transmitting information bits in the form of wideband chip sequences, but they have noticeable differences in terms of embedded data modulation methods, i.e., from the most popular BPSK and QPSK to the higher-order QAM and the codeword selection modulations.

The code complementary keying (CCK)-based DSSS system has recently been adopted as a 5.5 Mbps/11 Mbps rate 802.11b standard for higher speed extension of the original 1 Mbps/2 Mbps rate 802.11 WLAN. The 802.11b DSSS/CCK is a codeword selection modulation based spread spectrum method which can transmit 4 or 8 information bits per symbol using an 8-long quaternary complementary codeword set of size 256.

Because CCK codewords have good auto- and cross-correlation properties, a typical maximal ratio combining (MRC) RAKE receiver and codeword correlator bank can achieve satisfactory decoding performance in additive Gaussian or moderate multipath channels. However, as the multipath delay spread becomes larger than 100 ns, the simple RAKE-based correlator bank cannot sustain this performance any longer and thus it is necessary to complement the receiver with complex signal processing such as equalization of ISI or inter-chip interference (ICI).

To perform MRC processing and equalization, the receiver needs to know accurate multipath channel coefficients. In a typical wireless LAN environment where the multipath channel changes very slowly and its profile is closely spaced, the channel coefficients are usually estimated in advance using a wideband preamble sequence part and the estimates are used to decode a data symbol part in the same packet. In this case, the MRC RAKE receiver can be implemented in the form of a channel matched filter (CMF) whose taps are the conjugate of the time-reversed channel estimates, and it is usually placed in front of the correlator bank in order to minimize the receiver implementation complexity by completing the multipath combining before codeword correlation. The CMF not only provides a multipath diversity advantage but also warrants robust time-tracking during the data symbol detection, as the signal has a symmetrical shape around a real-valued central peak after passing through the CMF.

On the other hand, if a decision feedback equalizer (DFE) is employed between the CMF and the codeword correlator bank to improve the detection performance, the associated DFE coefficients should also be estimated using the preamble part. In the case that only a feedback filter is employed that cancels a postcursor-ISI, the DFE coefficients can be directly calculated through a simple auto-correlation of the CMF coefficients. However, if a feedforward filter is incorporated to further improve performance by suppressing precursor-ISI, receiver complexity significantly increases because one or more of a complex matrix inversion, spectral factorization, or adaptive equalizer training must also be applied.

A feedforward filter requires complex multiplication operations in data detection processing, while a feedback filter needs only addition operations. Thus, in practical high-speed WLAN packet transmissions, the DFE is usually composed of only a feedback filter without the capability of precursor-ISI suppression. When the multipath delay spread becomes long, the remaining precursor-ISI critically affects the packet decoding performance.

In view of the foregoing, a need exists for a practically feasible precursor-ISI cancellation system and method, and more particularly one which may be used in a variety of communications systems including but not limited to a DSSS packet receiver.

SUMMARY OF THE INVENTION

An object of the present invention is to provide a practically feasible precursor-ISI cancellation system and method which may be used in a variety of communications systems including but not limited to a DSSS packet receiver.

Another object of the present invention is to provide an improved precursor-ISI cancellation system and method which is implemented in a DSSS/CCK communications system.

Another object of the present invention is to provide an improved DSSS/CCK RAKE receiver which is robust in the multipath channel, which robustness is achieved by incorporating a novel, iterative ISI cancellation method and apparatus which cancels precursor-ISI interference and which is suitable for use in a system which performs DSSS/CCK communications.

Another object of the present invention is to provide a DSSS/CCK receiver which performs at least precursor and preferably both precursor and postcursor ISI cancellation with reduced computational complexity and delay time.

These and other objects and advantages are achieved by providing a bidirectional turbo ISI canceller (BTIC) which cancels precursor-ISI as well as postcursor-ISI without incorporating a multiplicative feedforward equalization filter. The iterative precursor-ISI and postcursor-ISI cancellation approach has been applied to a simple BPSK modulation case and the M-ary pulse amplitude modulation case. However, the BTIC of the present invention takes an integrated approach of a time-reversed signal processing, a tentative decision based precursor cancellation, and an iterative (turbo) signal processing after tailoring them for DSSS/CCK codeword detection.

To improve detection performance systematically, at least one embodiment of the present invention takes a three-step receiver design approach. The first step includes designing an optimal single-symbol RAKE receiver comprising a CMF, a codeword correlator bank, and an energy bias (EB) canceller under the assumption that no ISI is generated by preceding or trailing symbols. For a more realistic multipath channel case, a second step incorporates a DFE for suppressing postcursor-ISI caused by a preceding symbol. Finally, a unique precursor ISI canceller is used to remove the remaining ISI caused by a trailing symbol. All three components may then integrated into a BTIC-based receiver applying turbo-iteration processing.

In detecting each CCK symbol, a DFE and a codeword correlator bank is employed twice per iteration to cancel both the postcursor-ISI and the precursor-ISI. Because the DFE coefficients used in the precursor-ISI cancellation take the same coefficients as in the postcursor-ISI cancellation, no additional hardware or new coefficient calculation is needed to realize the BTIC. As the performance improvement through the precursor-ISI cancellation becomes more and more significant as multipath delay spread increases, the BTIC is greatly useful to sustain the DSSS/CCK system performance in heavy-tailed multipath channels.

While a preferred embodiment contemplates applying the receiver design to a high-speed 802.11b wireless LAN system to improve receiver decoding performance in multipath channel environments, other embodiments may be applied to a variety of DSSS communication systems with slight modification to improve decoding performance in static or slowly fading multipath channels.

DETAILED DESCRIPTION OF THE PREFERRED EMBODIMENT

Figure 1A:
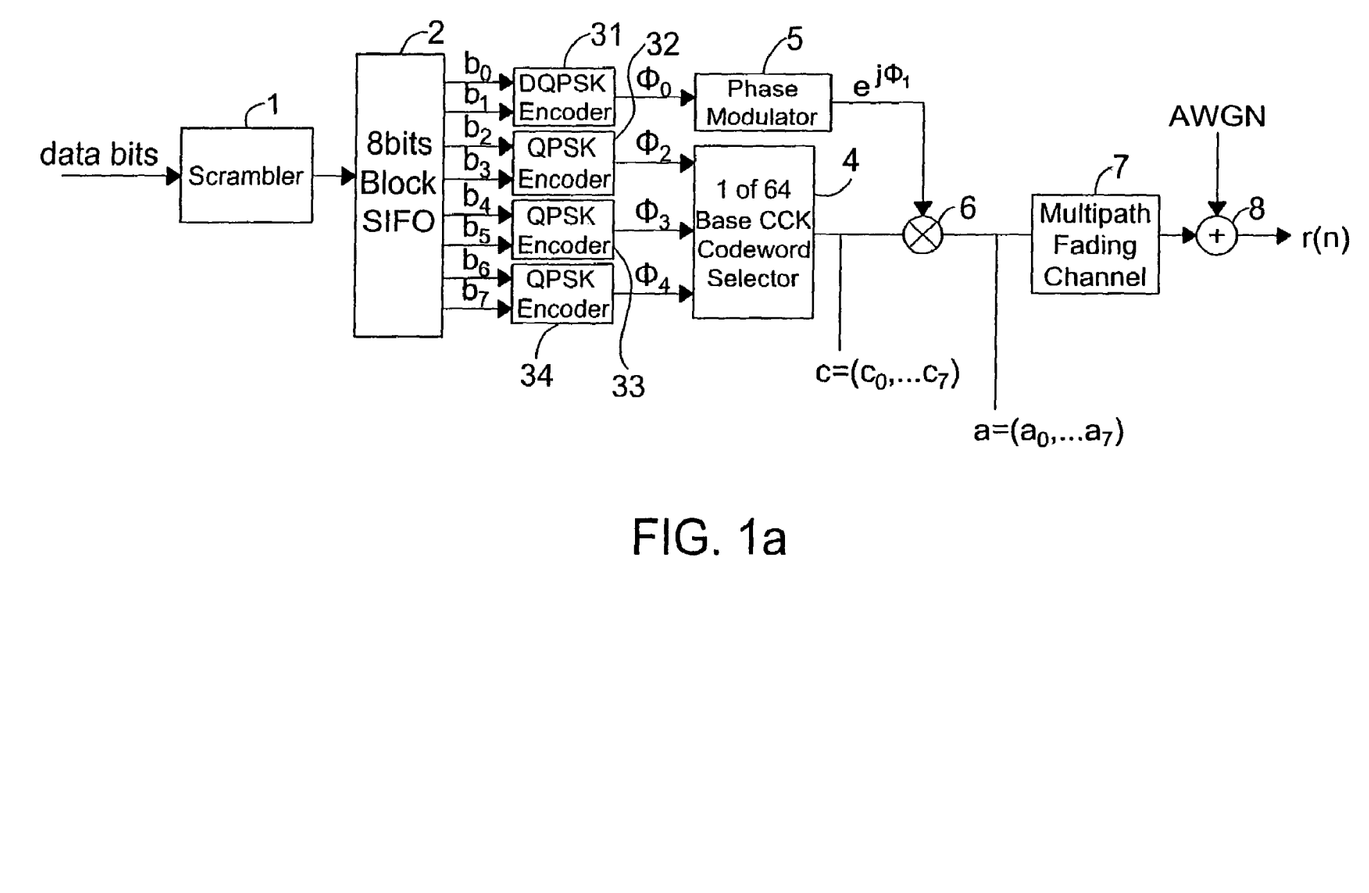
FIGS. 1(a) and 1(b) are diagrams respectively showing preferred embodiments of a transmitter and receiver in accordance with the present invention which, for example, may be used for DSSS/CCK communications in an IEEE 802.11b wireless LAN application.
Figure 1B:
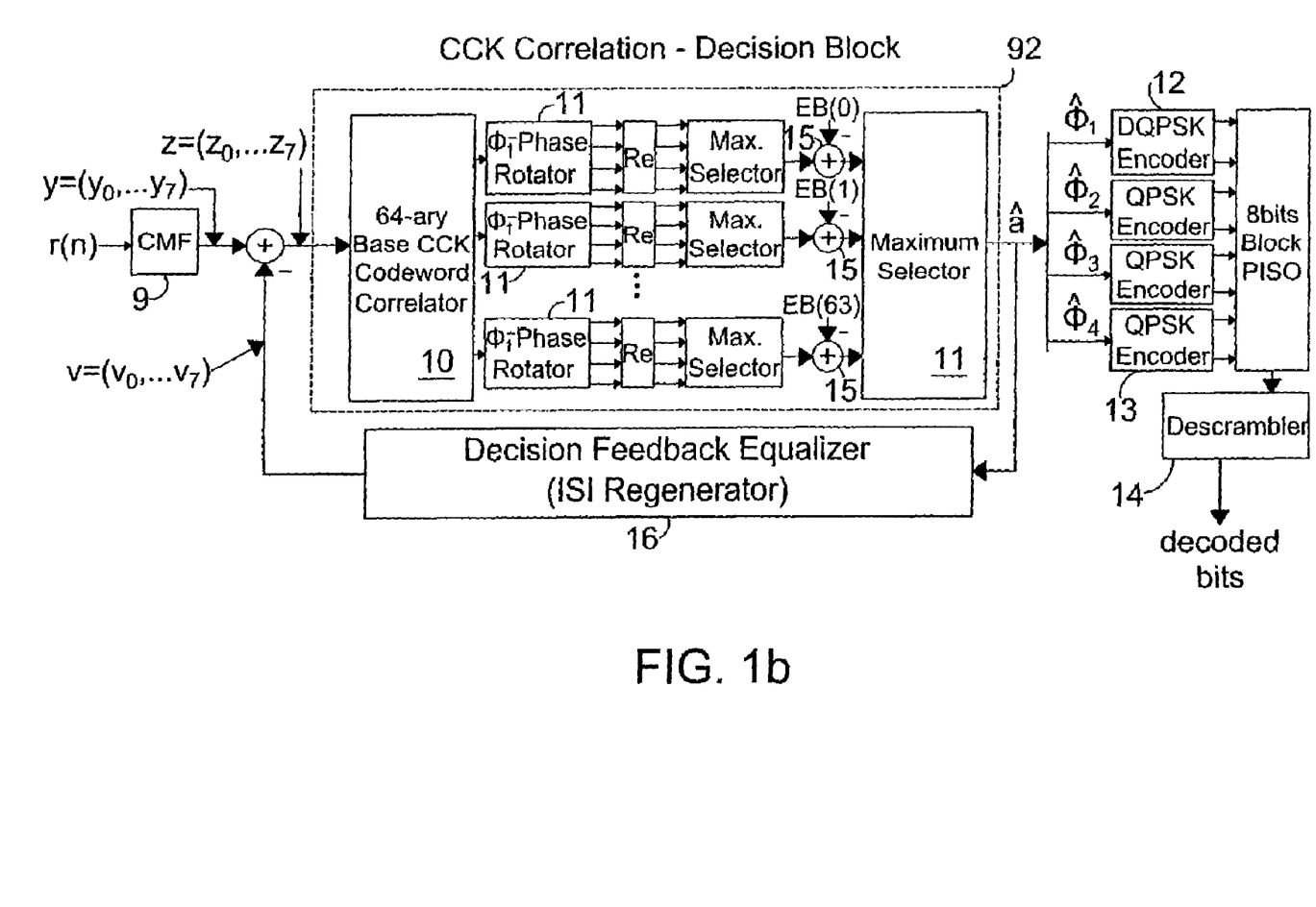

FIGS. 1(a) and 1(b) are block diagrams of a DSSS/CCK communication system which, for example, may be employed in an IEEE 802.11b wireless LAN. As shown in FIG. 1(a), source bits in a data packet are first scrambled by a scrambler 1 and grouped into the kth 8-bit block 2 (b(k)={$b_0$(k), $b_1$(k), ... $b_7$(k)}) at time k(k=0,1, ..., K−1). Then, the first bit pair ($b_0$(k), $b_1$(k)) is mapped to a differentially encoded phase angle $\phi_1$(k) based on a DQPSK encoder 31 and the other bit pairs ($b_2$(k), $b_3$(k)), ($b_4$(k), $b_5$(k)), and ($b_6$(k), $b_7$(k)) are respectively mapped to $\phi_2$(k), $\phi_3$(k), and $\phi_4$ based on a natural QPSK encoding in encoders 32, 33, and 34. Note that each of the four angles can take a value in the set of {0, $\pi/2$, $\pi$, $3\pi/2$}. Among the four angles, the naturally encoded angles $\phi_2$(k), $\phi_3$, and $\phi_4$ are used to generate one of 64 base CCK codewords c(k)=($c_0$(k), $c_1$(k), ..., $c_7$(k)) in selector 4 according to the following equation:

$$c(k) = (e^{j(\phi_2(k)+\phi_3(k)+\phi_4(k))}, e^{j(\phi_3(k)+\phi_4(k))}, e^{j(\phi_2(k)+\phi_4(k))}, \\ -e^{j\phi_4(k)}, e^{j(\phi_2(k)+\phi_3(k))}, e^{j\phi_3(k)}, -e^{j\phi_2(k)}, 1), \quad (1)$$

The differentially encoded angle $\phi_1$, (k) is used by phase modulator 5 to modulate the envelop of the resulting base CCK codeword which ultimately determines one of 256 complete CCK codewords:

$$a(k) = (e^{j(\phi_1(k)+\phi_2(k)+\phi_3(k)+\phi_4(k))}, e^{j(\phi_1(k)+\phi_3(k)+\phi_4(k))}, \\ e^{j(\phi_1(k)+\phi_2(k)+\phi_4(k))}, -e^{j(\phi_1(k)+\phi_4(k))}, e^{j(\phi_1(k)+\phi_2(k)+\phi_3(k))}, \\ e^{j(\phi_1(k)+\phi_3(k))}, -e^{j(\phi_1(k)+\phi_3(k))}, e^{j\phi_1(k)}). \quad (2)$$

The transmitted codewords are convolved 6 with a multipath fading channel 7 (h=( ... , 0,0,0,h(0),h(1), ... ,h(L−1), 0,0,0, ... )) and corrupted by additive white Gaussian background noise in adder 8.

As shown in FIG. 1(b), the CCK receiver receives the signal and in effect provides deformed signal samples as follows:

$$r(j) = \sum_{k=0}^{K-1} \sum_{i=0}^{7} a_i(k) h(j-i-8k) + n(j), \quad j = 0, 1, 2, \ldots \quad (3)$$

at the receiver front-end, where n(j) is a zero-mean circularly-symmetric complex white Guassian noice process of variance $N_0$. We assume that the multipath channel coefficients take exponentially decaying complex Gaussian random variables according to the IEEE 802.11b channel model. Moreover, we assume a quasi-static fading channel in the description of the invention, where the channel coefficients are fixed for each packet transmission and change independently in every packet.

Figure 2:
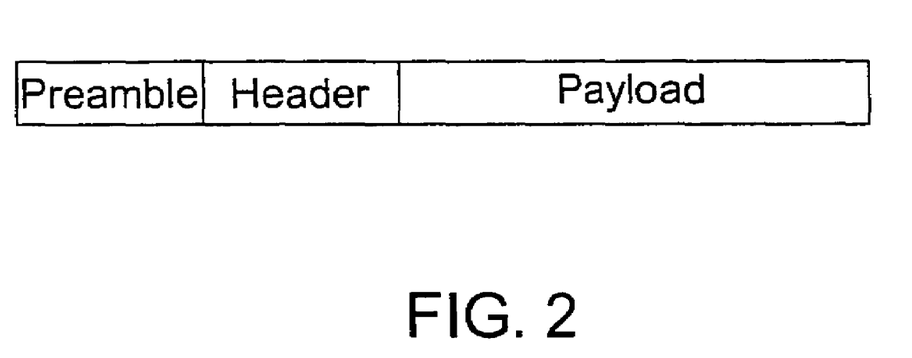
FIG. 2 is a diagram showing a DSSS/CCK data packet structure including a preamble, header, and payload for use in a wireless LAN application.

The received signal is first convolved with the channel matched filter (CMF) 9, which corresponds to the conjugate of the time-reversed multipath channel impulse response h=(h*(L−1),h*(L−2), ... ,h*(0)) yielding 8 soft chip values in every CCK symbol interval. The CMF coefficients are estimated in advance using the preamble part of each packet. As shown in FIG. 2, in a typical WLAN packet transmission the data packet is formed by juxtaposition of preamble, header, and payload parts, where the preamble part is a known or easily detected sequence transmitted to help the receiver perform packet detection, carrier and timing synchronization, channel estimation, as well as to perform other functions.

Returning to FIG. 1(b), CCK codeword correlator 10 correlates the soft chips with 64 possible base CCK codewords to yield 64 complex soft metrics, each of which is rotated by four possible angles in rotators 11 to resolve the uncertainty of $\phi_1$(k). The real parts (Re) of the resulting 256 decision statistics are compared to determine the codeword â(k) that yields the maximum output value which is output from selector 11. The determined codeword is decoded to 8 bits by DQPSK decoder 12 and QPSK decoders 13 and descrambled 14 to restore the 8 source bits. The DQPSK decoding of $\phi_1(k)$ allows the 4-phase ambiguity problem associated with carrier phase recovery to be avoided. In order to improve detection performance, energy-bias (EB) cancellation 15 or decision-feedback equalization techniques 16 may be incorporated in the CCK correlation, which can bring in a significant performance gain when the propagation channel has a long delay spread.

An optimal DSSS/CCK detector design procedure using the received signal sample sequence r(j) in Equation (3) will now be described in accordance with one embodiment of the present invention. In this description, N denotes the number of chips in a CCK symbol. For illustrative purposes, the case where N=8 is specifically discussed, however those skilled in the art can appreciate that N may be another number if desired. Because the multipath delay spread in typical wireless LAN environments is longer than the CCK chip period $T_c$ and shorter than the entire CCK symbol period $NT_c$, it can be assumed, in designing the CCK detector, that the kth CCK symbol is in effect determined by the received samples of only three symbols, e.g., the (k−1)th, the kth, and the (k+1)th ones. Therefore, Equation (3) may be rewritten into a truncated sample sequence of length 4N−1 as:

$$r^{(k)}(j) = \sum_{i=0}^{N-1} a_i(k-1)h(j-i-(k-1)N) + \qquad (4)$$

$$\sum_{i=0}^{N-1} a_i(k)h(j-i-kN) +$$

$$\sum_{i=0}^{N-1} a_i(k+1)h(j-i-(k+1)N)$$

$$n(j), \qquad j=(k-1)N, (k-1)N+1\cdots,(k+3)N-2$$

when the kth symbol detection is concerned. Note that $h(i) \approx 0$ when i<0 or $i \geq N$, under the above assumption. Though the maximum channel length to the CCK symbol length may be restricted in this section to facilitate description of the receiver design, the design procedure can be extended to longer channel cases in a straightforward manner.

A. Optimal Single-Symbol Detector

As a first step in the detector design, $\{a_i(k-1)\}$ and $\{a_i(k+1)\}$ may be temporarily set to all-zero chip sequences, which means no postcursor-ISI nor precursor-ISI is involved in the detection processing. Note that this assumption warrants an ISI-free condition between neighboring symbols, but the ICI between the chips in a CCK symbol may still causes a performance degradation. Then, at time k the maximum likelihood (ML) single-symbol detector selects the m-th (m 0, 1, 255) hypothetical symbol $a^{[m]}$ that maximizes the logarithmic likelihood probability:

$$\tilde{\Lambda}(a^{[m]}) = -\frac{1}{N_0} \sum_{j=kN}^{(k+2)N-2} |r^{(k)}(j) - \sum_{i=0}^{N-1} a_i^{[m]}h(j-i-kN)|^2, \qquad (5)$$

which is equivalent to $a^{[m]} = (a_0^{[m]}, a_1^{[m]}, \ldots, a_{N-1}^{[m]})$ that maximizes $$\tilde{\Lambda}(a^{[m]}) = \qquad (6)$$

$$R\{\sum_{i=0}^{N-1} a_i^{[m]*} \sum_{j=0}^{2N-2} r^{(k)}(kN+j)h^*(j-1)\} - \frac{1}{2}\sum_{j=0}^{2N-2} |\sum_{i=0}^{N-1} a_i^{[m]}h(j-i)|^2,$$

where R{A},J{A}, and A* respectively denote the real part, the imaginary part, and the conjugate of a complex number A. Now noting that h(i) is zero when i<0 and $i \geq N$, we can determine how to implement the optical canonical detector when no precursor-ISI or postcursor-ISI exists. For the correlation part (i.e., the first term of Equation (6)), the received chip sample sequence $\{r^{(k)}(kN+j)\}$ is convolved with the CMF $\tilde{h}$, and then the consecutive N CMF output samples are correlated with the conjugates of 256 codewords. On the other hand, for the EB cancellation part (i.e., the second term of Equation (6)), a look-up table composed of 64 entries may be used, where each entry can be calculated and stored during the preamble reception period when estimation of the CMF coefficients is completed.

Note that the phase uncertainty of $\phi_1(k)$ does not affect the energy bias term in Equation (6). Also note that the EB cancellation need not be considered in flat fading or AWGN channels as the energy of all CCK symbols is equal if a frequency-selective signal distortion does not occur during the transmission. However, in typical frequency-selective multipath wireless channels, the ICI components cause each codeword to have different signal energy at the receiver front-end, and thus the EB cancellation is essential for optimal detection.

The computational cost of the EB look-up table construction can be significantly reduced by further manipulating the second term of Equation (6). By expanding and manipulating the second term EB(m),m=0,1 . . . ,63, we can get:

$$EB(m) = R\{\sum_{i=1}^{N-1} \rho_a(m;i)^* \rho_h(i)\} + \frac{1}{2}\rho_a(m;0)\rho_h(0), \qquad (7)$$

where $$\rho_h(i) \triangleq \sum_{j=0}^{2N-2} h(j)h(J-i)^*, i=-N+1,\cdots,N-1 \qquad (8)$$

and $$\rho_a(m;i) \triangleq \sum_{j=0}^{N-1} a_j^{[m]} a_{j-i}^{[m]*}, i=-N+1,\cdots,N-1 \qquad (9)$$

respectively represent the aperiodic correlation coefficients of the multipath channel and the mth codeword. The second term in Equation (7) may be neglected, as $\rho_a$ (m;0) takes the same value for all CCK codewords. (Without loss of generality, the four different codewords generated by the multiplication of four $\phi_1$ values and the mth base CCK codeword (m=0,1, . . . ,63) are denoted by $a^{[m]}$, $a^{[m+64]}$, $a^{[m+128]}$, and $a^{[m+192]}$.) Therefore, in order to realize the EB cancellation, 64(N−1) CCK codeword coefficients $\rho_a$(m;i), m=0,1, . . . ,63, i=1,2, . . . ,N−1 are preferably stored in advance and then (N−1) channel coefficients $\rho_h$(i),i=1,2, . . . ,N−1 are calculated and 64 EB values EB(m), m=0,1, . . . , 63 are obtained according to the above equations when the CMF estimation is completed during the preamble reception.

In FIG. 1(b), a concatenated structure of the CMF and the CCK correlation-decision block incorporating the EB canceller is depicted, which determines the transmitted codeword based on the optimal signal-symbol processing of Eq. (6). If desired, the EB canceller may be omitted for simple implementation at the cost of a small degradation of decoding performance.

Figure 3:
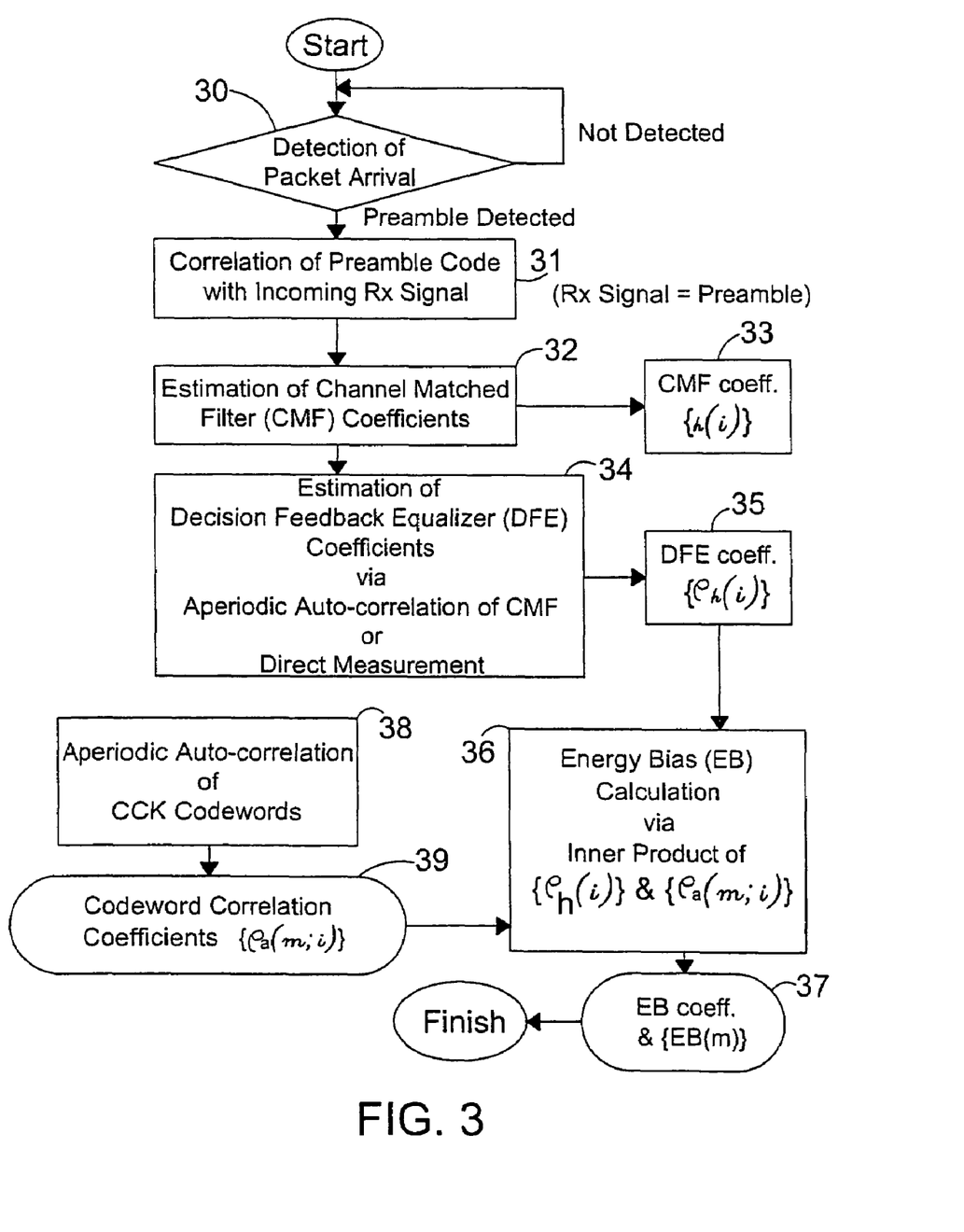
FIG. 3 is a flow chart showing steps which may be used to perform filter coefficient estimation in accordance with one embodiment of the present invention.

For the implementation of the receiver depicted in FIG. 1(b), we need to estimate three sets of coefficients, i.e., CMF coefficients, DFE coefficients, and EB coefficients. FIG. 3 describes the procedure to estimate these coefficients. First, when the receiver detects the arrival of a packet preamble by using energy measurement or other methods (Block 30), the receiver correlates the known preamble code with the incoming received signal (Block 31). By accumulating the correlation results for each chip time (or half-chip time) offset over multiple preamble symbols, the CMF coefficients $\{h(i)\}$ can be determined and output. (Blocks 32 and 33). The DFE coefficients $\{\rho_h(i)\}$ are then calculated via the aperiodic correlation of the CMF coefficients as is formulated in Equation (8). The DFE coefficients may also be measured for each chip time (of half-chip time) offset by correlating the incoming receive signal with the estimated CMF coefficients over multiple preamble symbols. (Block 34). Finally, the EB coefficients are calculated by applying the inner-product between the DFE coefficients $\{\rho_h(i)\}$ 35 and the CCK codeword correlation coefficients $\{\rho_a(m;i)\}$ as is formulated in Equation 7 (Blocks 36 and 37), where $\{\rho_a(m;i)\}$ is calculated in advance via the aperiodic correlation of the mth CCK codeword $\{a_i^{[m]}\}$ in Equation 9 (Blocks 38 and 39).

Figure 4:
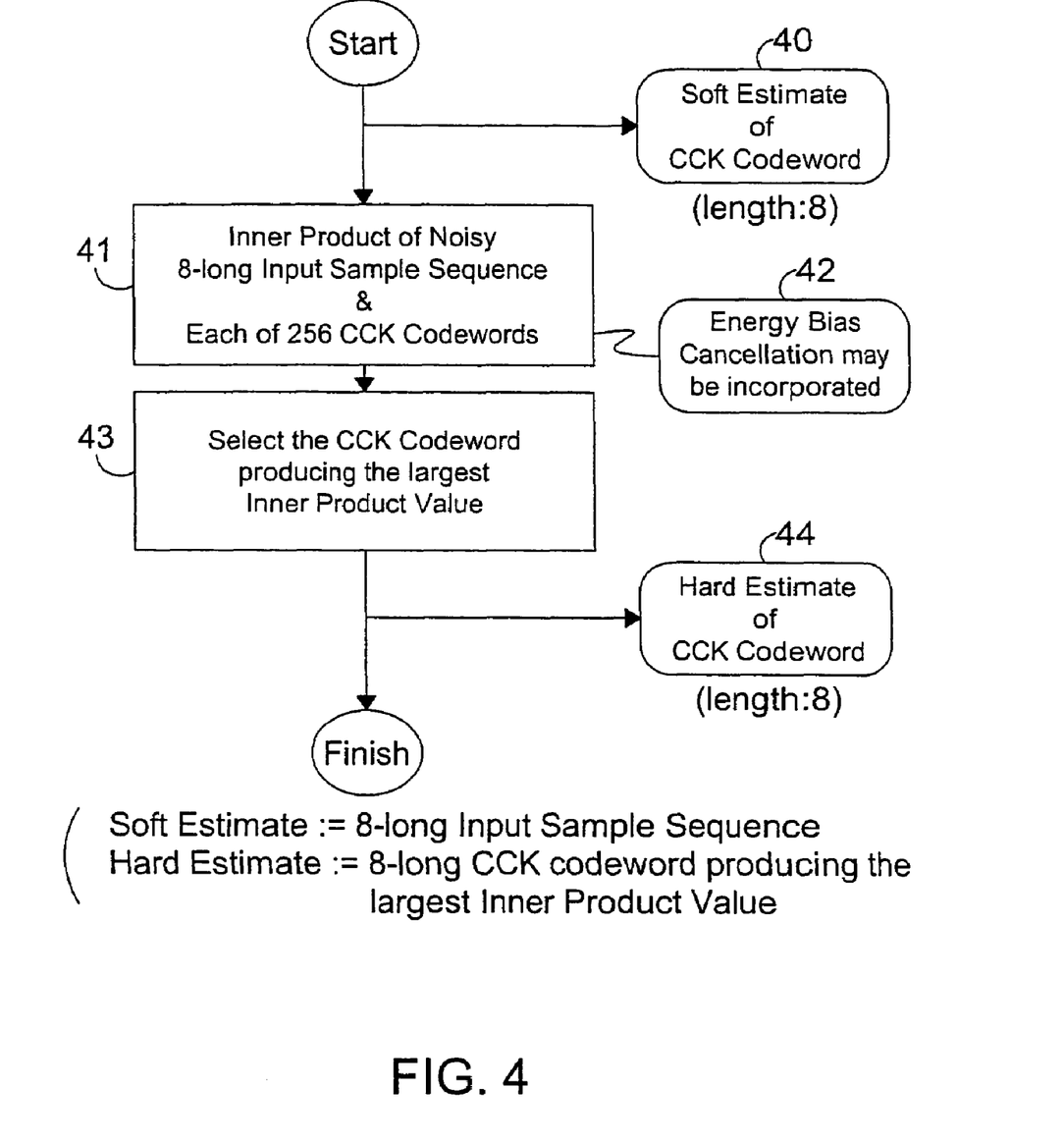
FIG. 4 is a flow chart showing steps which may be used to perform a CCK correlation-decision block operation in accordance with one embodiment of the present invention.

FIG. 4 describes the operation of the correlation-decision block embedded in the receiver in FIG. 1(b). First, the 8-long input sample sequence corresponding to the noisy chips of a CCK symbol is stored as the soft estimate of the received CCK codeword. (Block 40). Then, the input sample sequence is correlated (inner-producted) with each of 256 CCK codewords (Block 41) and, optionally, the energy bias terms for each CCK codewords are subtracted from the corresponding correlation results (Block 42). Then the CCK codeword yielding the largest output value is selected as the hard estimate of the received CCK codeword. (Blocks 43 and 44).

The 256 correlations and the maximum selection processing may be implemented in an efficient form by grouping them into 64 sets of 4 elements which have the same base CCK codeword: First, 64 correlations between the input sample and 64 base CCK codewords are performed, each correlation results are multiplied by 4 possible values of the envelop symbol, and real parts of the multiplication results are taken. The maximum of the 4 real parts in each group is selected as the survivor of the group and the corresponding energy bias is subtracted. Finally, the 64 survivors are compared and the CCK codeword producing the maximum survivor value is selected as the hard estimate of the received CCK codeword.

B. Incorporation of Postcursor-ISI Canceller

The optimal single-symbol detector described in the previous section is not optimal any longer in practical multiple-symbol transmission applications, as the ISI components between neighboring symbols have not been considered in designing the detector. Both the postcursor-ISI caused by the previous symbol and the precursor-ISI caused by the orthcoming symbol degrade system performance. The postcursor ISI cancellation is first addressed in this section by modifying the previous ISI-free assumption, such that only the forthcoming symbol $\{a_i(k+1)\}$ is an all-zero chip sequence as in Equation (3). The mitigation method of the precursor-ISI, which is more difficult to resolve in the context of DSSS/CCK communications and which is a key proposal of the present invention, will be separately discussed in the next section.

In order to quantify the non-zero postcurosor-ISI associated component resulting from the detection processing in Equation (6), the first term of Equation (6) is expanded by replacing $r^{(k)}(kN+j)$ with Equation (4), where the current symbol $\{a_i(k)\}$, the forthcoming symbol $\{a_i(k+1)\}$, and the additive noise $n(j)$ are set to all-zero sequences. Then, the expansion result is represented by:

$$I_{post}(a^{[m]}) = \mathfrak{R}\{\sum_{i=0}^{N-2} a_i^{[m]*} \sum_{n=i+1}^{N-1} a_{N+i-n}(k-1)\rho_h(n)\}. \tag{10}$$

for the channel correlation coefficients $\{\rho_h(n)\}$ defined in Equation (8). In the above equation, we observe that the postcursor-ISI can be perfectly cancelled in front of the CCK correlator by employing a feedback filter and a previously detected CCK chip sequence $\{\tilde{a}_i(k-1)\}$. FIG. 1(b) shows the DFE that subtracts a corresponding postcursor-ISI term:

$$v_i^{post}(k) = \begin{cases} \sum_{n=i+1}^{N-1} \tilde{a}_{N+i-n}(k-1)\rho_h(n), & i = 0, 1, \ldots, N-2, \\ 0, & i = N-1 \end{cases} \tag{11}$$

from each soft chip value $y_i(k)$ to provide the CCK correlator with an improved (or, postcursor-ISI cancelled) chip metric:

$$z_i(k) = y_i(k) - v_i^{post}(k), i = 0, 1, \ldots, N \tag{12}$$

Figure 5:
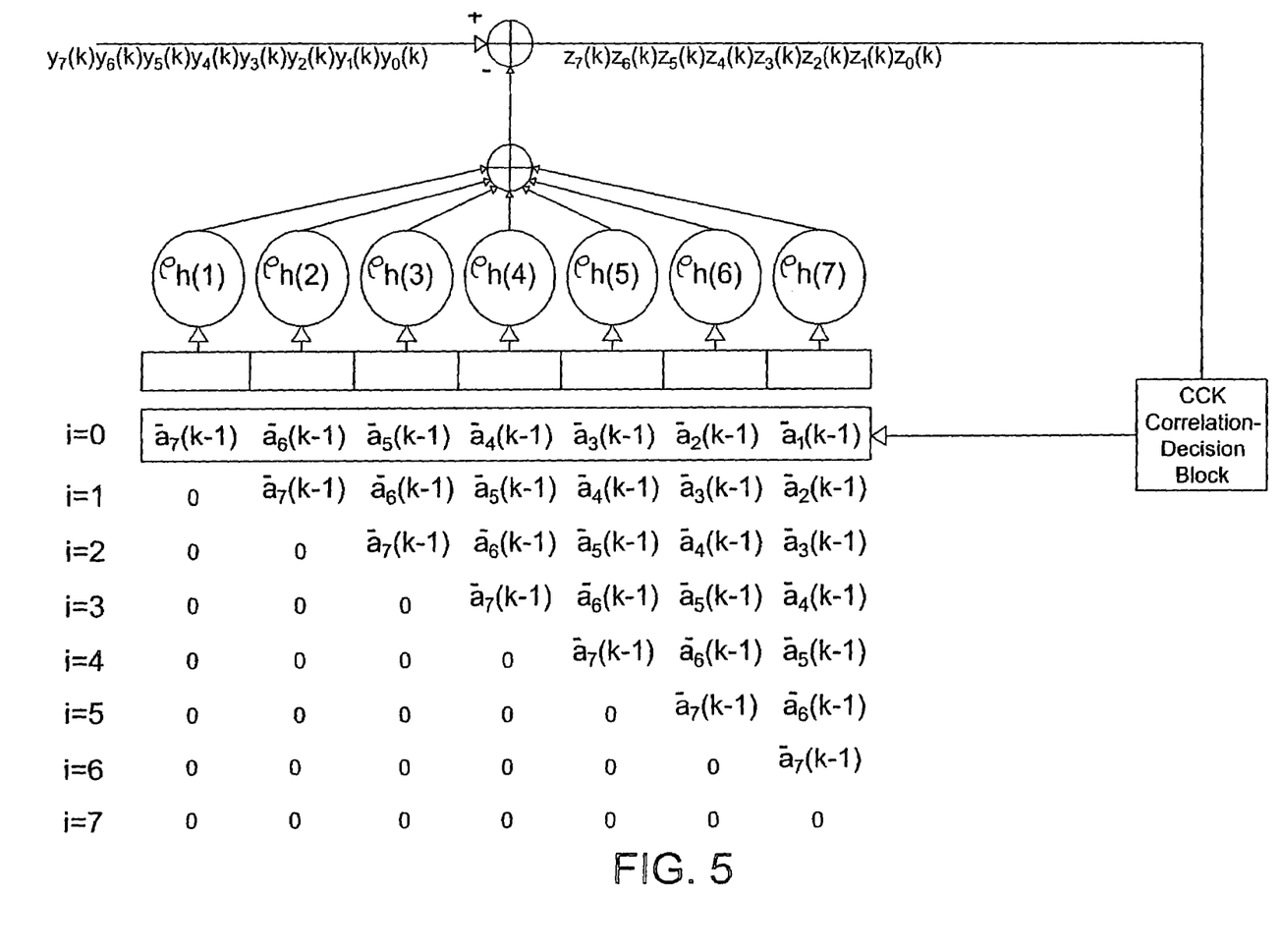
FIG. 5 is a diagram showing an internal structure and associated operation of one type of decision feedback equalizer (DFE) which may be used to cancel postcursor-ISI arising in multipath channels of a DSSS/CCK receiver in accordance with the present invention.

FIG. 5 illustrates the internal structure and operation of the DFE. When the (k−1)th symbol decision is completed, the last N−1 chips $(\tilde{a}_{N-1}(k-1), \tilde{a}_{N-2}(k-1), \ldots, \tilde{a}_1(k-1))$ are used to initialize the N−1 storages of the DFE whose coefficients are set to $(\rho_h(1), \rho_h(2), \ldots, \rho_h(N-1))$. Then, the stored chips are shifted N times (i=0,1, ..., N−1) from left to right at every chip clock, outputting the corresponding postcursor-ISI $v_i^{post}(k)$ to be subtracted from the input soft chip value $y_i(k)$. The refined soft metrics resulting from the subtraction $z_i(k), i=0,1, \ldots, N-1$, are used to determine the kth symbol decision.

Figure 6:
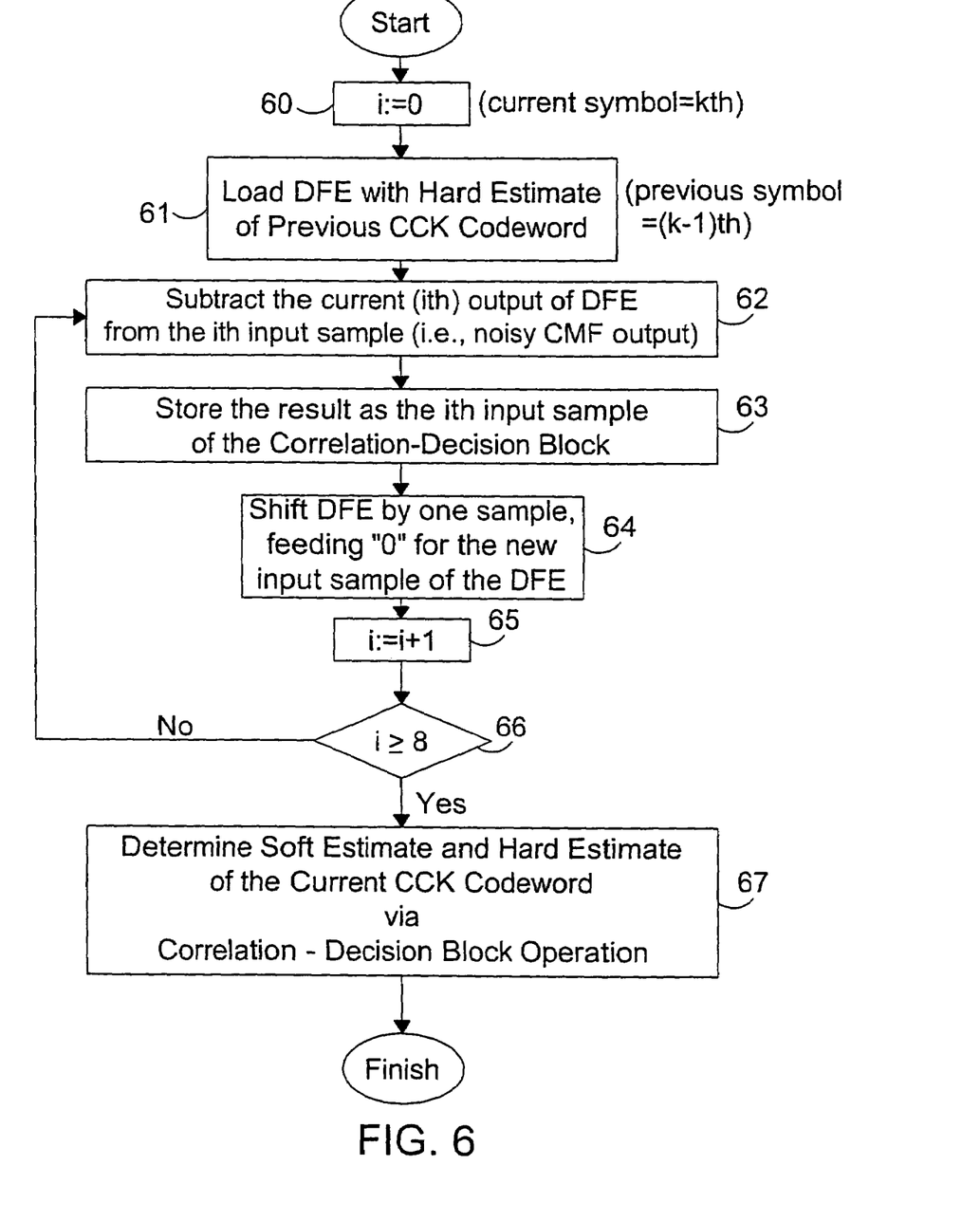
FIG. 6 is a flow chart showing steps which may be performed by the DFE of FIG. 5 to cancel postcursor-ISI and to perform current CCK codeword estimation.

FIG. 6 summarizes the procedure of the postcursor-ISI cancellation and current CCK codeword estimation. At the beginning, the chip time index I is set to 0 (Block 60) and the hard estimate of the previous CCK codeword is loaded to the DFE in FIG. 3 (Block 61). (For the hard and soft estimates of a CCK codeword, refer to FIG. 4.) The current output of the DFE is then subtracted from the ith input sample, which corresponds to the ith noisy CMF output value (Block 62), and the result is stored as the ith input sample of the correlation-decision block (Block 63). Next, the DFE is shifted by one sample and 0 is fed as the new input sample of the DFE. (Block 64). The chip time index I is incremented by 1 (Block 65), and if I is smaller than 8 the process returns to 62 (Block 66). Otherwise, soft and hard estimates of the current CCK codeword are determined via the correlation-decision block operation described in FIG. 4 and the operation is finished. (Block 67).

C. Time-Reversed Precursor-ISI Cancellation

As a next step of the optimal detector design of the present invention, the precursor-free assumption of the previous sections is removed and all the symbols $\{a_i(k-i)\}$, $\{a_i(k)\}$, and $\{a_i(k+1)\}$ are set to be nonzero chip sequences. Because a reliable estimate of the precursor-ISI is not available when the current symbol is to be determined, hypothetical detection methods that rank the decision statistics associated with all possible forthcoming symbols $\{a_i^{[m]}(k+1):m=0,1,\ldots,256\}$ could be applied for optimal detection. However, the hypothetical detection methods request 65,536 (or, 256×256) decision statistics, making them practically infeasible in the CCK codeword detection.

As an alternative, a sub-optimal precursor filtering that suppresses the precursor-ISI may be employed between the CMF and the CCK correlator. However, the introduction of the precursor filtering devastates the optimal CCK single-symbol detection scheme that necessitates a concatenation of the CMF, the CCK correlator, and the EB canceller. Furthermore, the precursor filtering often causes noise enhancement without an extremely complex spectral factorization or a coefficient adaptation approach, and degrades time-tracking performance by deforming the symmetric CMF output sample sequence. Therefore, the traditional precursor-ISI mitigation approaches are not applicable to the DSSS/CCK-based packet communication systems, and we demand a new method that can efficiently cancel the precursor-ISI without affecting the structure of the optimal CCK single-symbol detector.

In order to devise a precursor cancellation scheme, the present invention quantifies the precursor-ISI generated during the kth symbol detection in the similar way as was done in the last section. By expanding the first term of Eq. (6) under the assumption that both $\{a_i(k-i)\}$ and $\{a_i(k)\}$ are all-zero chip sequences and no AWGN is added in the channel, we obtain the precursor-ISI associated component:

$$I_{pre}(a^{[m]}) = \Re\left(\sum_{i=1}^{N-1} a_i^{[m]*}\left(\sum_{n=N-i}^{N-1} a_{n-(N-i)}(k+1)^* \rho_h(n)\right)^*\right) \quad (13)$$

Now, by carefully comparing Eq. (13) with Eq. (10), we find out that the precursor-ISI and the postcursor-ISI have symmetric relations each other, and thus the precursor-ISI can also be cancelled by the same DFE that was employed for postcursor-ISI cancellation. More specifically, if we load the postcursor-ISI DFE with the conjugates of the chips of the future symbol and take a time-reversed sequence processing, precursor ISI cancellation instead of postcursor ISI cancellation may be realized in accordance with the present invention.

Figure 7:
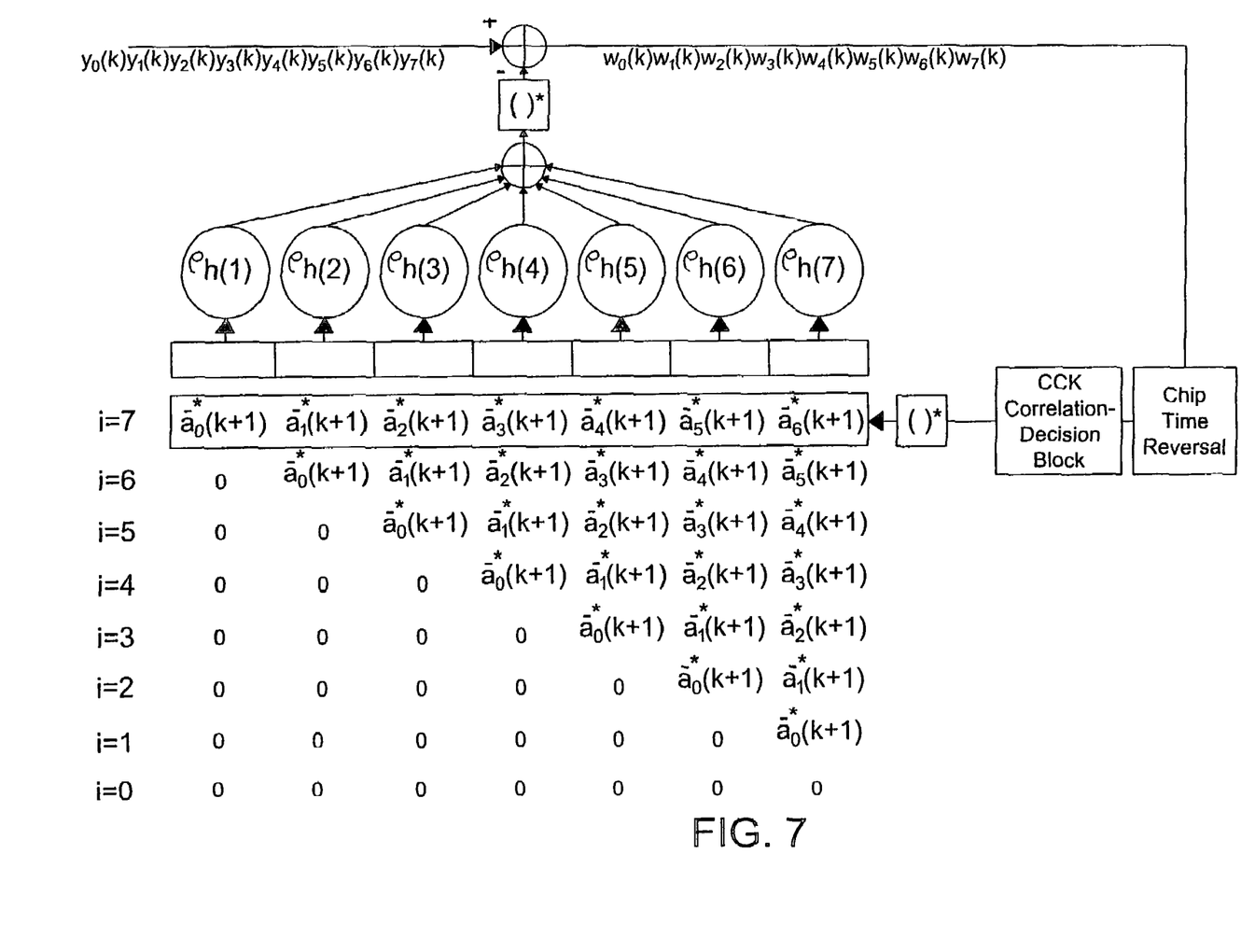
FIG. 7 is a diagram showing a structure and associated operation of one type of chip-time reversed decision feedback equalizer for a DSSS/CCK receiver that cancels precursor-ISI arising in multipath channels in accordance with the present invention, which equalizer may be the same DFE shown in FIG. 5 in accordance with a preferred embodiment.

FIG. 7 illustrates the associated DFE structure and the detailed processing, where the symbol time and chip time progress in the order of $[K-1, \ldots, k+1, k, k-1, \ldots 0]$ and $[N-1 \ldots, i+1, i, i-1, \ldots, 0]$, respectively. When the (k+1)th symbol detection is completed, the conjugates of the N−1 chips of the determined symbol $(\tilde{a}_0(k+1)^*, \tilde{a}_1(k+1)^*), \ldots \tilde{a}_{N-2}(k+1)^*)$ are used to initialize the N−1 storages of the DFE whose coefficients are set to $(\rho_h(1), \rho_h(2), \ldots, \rho_h(N-1))$. Then, the stored chips are shifted N times ($i=N-1, N-2, \ldots, 0$) from left to right at every chip clock and the conjugate of the corresponding output is taken as the precursor-ISI term:

$$v_i^{pre}(k) = \begin{cases} \left(\sum_{n=N-i}^{N-1} \tilde{a}_{n-(N-i)}(k+1)\rho_h(n)\right)^*, & i=N-1, N-2, \ldots, 1 \\ 0, & i=0 \end{cases} \quad (14)$$

which is subtracted from the input soft chip value $y_i(k)$. The refined soft metrics resulting from the subtraction $w_i(k), i=N-1, N-2, \ldots, 0$ are time-reversed and fed to the CCK correlator to determine the kth symbol decision.

While the EB cancellation and the postcursor-ISI cancellation have been tried in the legacy WLAN systems, it is unique in this invention to incorporate the precursor-ISI cancellation in the context of the DSSS/CCK wireless communications.

Figure 8:
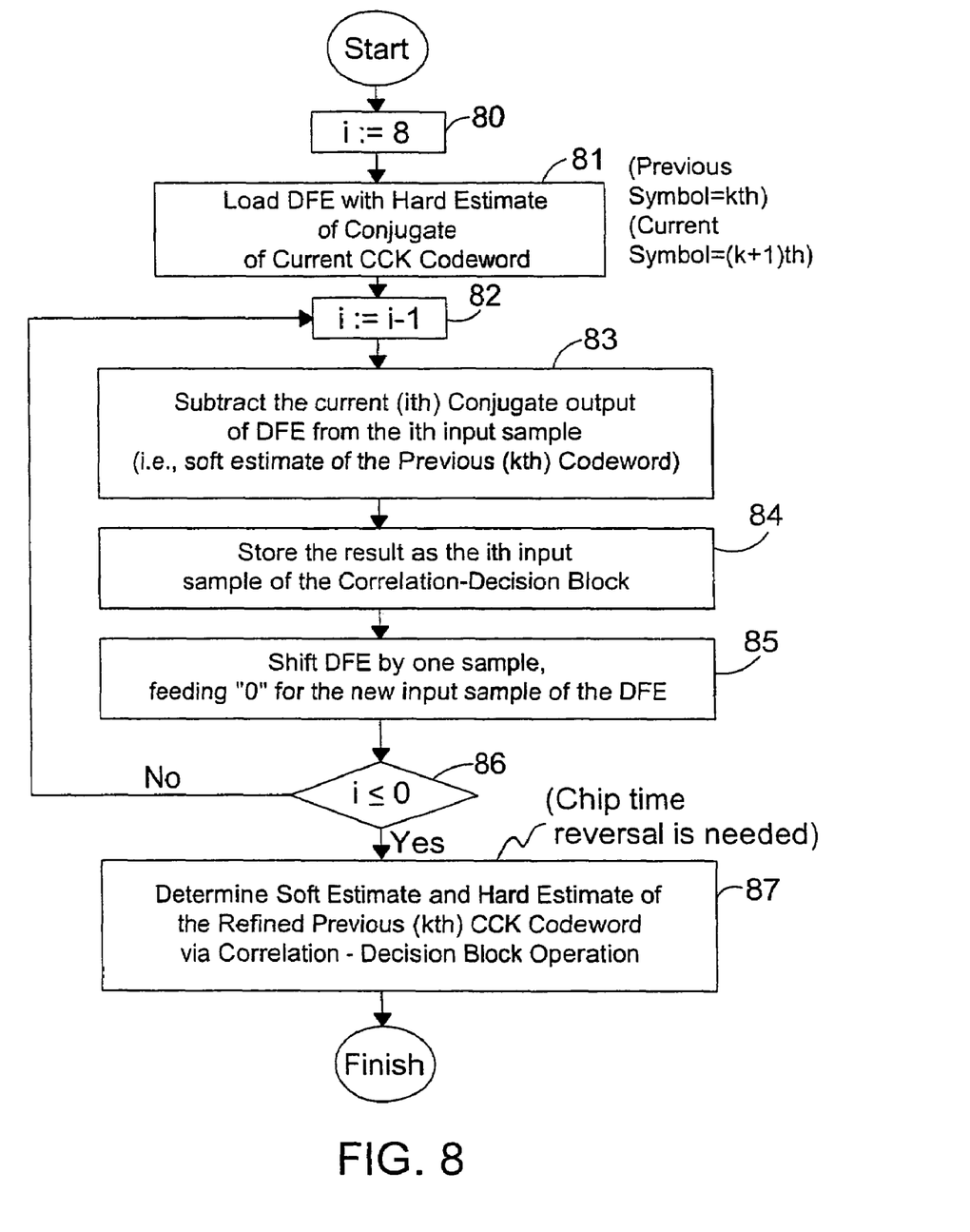
FIG. 8 is a flow chart showing steps which the DFE of FIG. 7 performs to cancel precursor-ISI and to perform previous CCK codeword estimation.

FIG. 8 summarizes the procedure of the precursor-ISI cancellation and previous CCK codeword estimation. At the beginning, the chip time index i is set to a predetermined value such as 8 (Block 80) and the conjugate of the hard estimate of the current CCK codeword is loaded to the DFE in FIG. 7 (Block 81). (For the hard and soft estimates of a CCK codeword, refer to FIG. 4.) Next, the chip time index i is decremented by 1. (Block 82). Then, the conjugate of the current output of the DFE is subtracted from the ith input sample, which corresponds to the ith noisy chip of the soft estimate of the previous CCK codeword (Block 83), and the result is stored as the ith input sample of the correlation-decision block (Block 84).

Continuing, the DFE is shifted by one sample and 0 is fed as the new input sample of the DFE. (Block 85). If i is greater than 0, the process returns to Block 82. (Block 86). Otherwise, the refined soft and hard estimates of the previous CCK codeword are determined via correlation-decision block operation described in FIG. 4 and the process is finished. (Block 87). In this procedure, note that the chip time reversal of the 8-long input sample sequence is needed before the correlation-decision block operation.

D. Bidirectional Turbo ISI Canceller

Up to now we have investigated all the component blocks needed to construct an optimal DSSS/CCK detector in accordance with the present invention, namely the optimal single-symbol detector with EB canceller, the postcursor-ISI canceller, and the time-reversed precursor-ISI canceller. The manner in which an entire system can be synthesized to effectively utilize all the component blocks will now be discussed. In synthesizing these components, an integration solution is found using a tentative-decision based precursor ISI cancellation approach and iterative (or turbo) signal processing.

Figure 9:
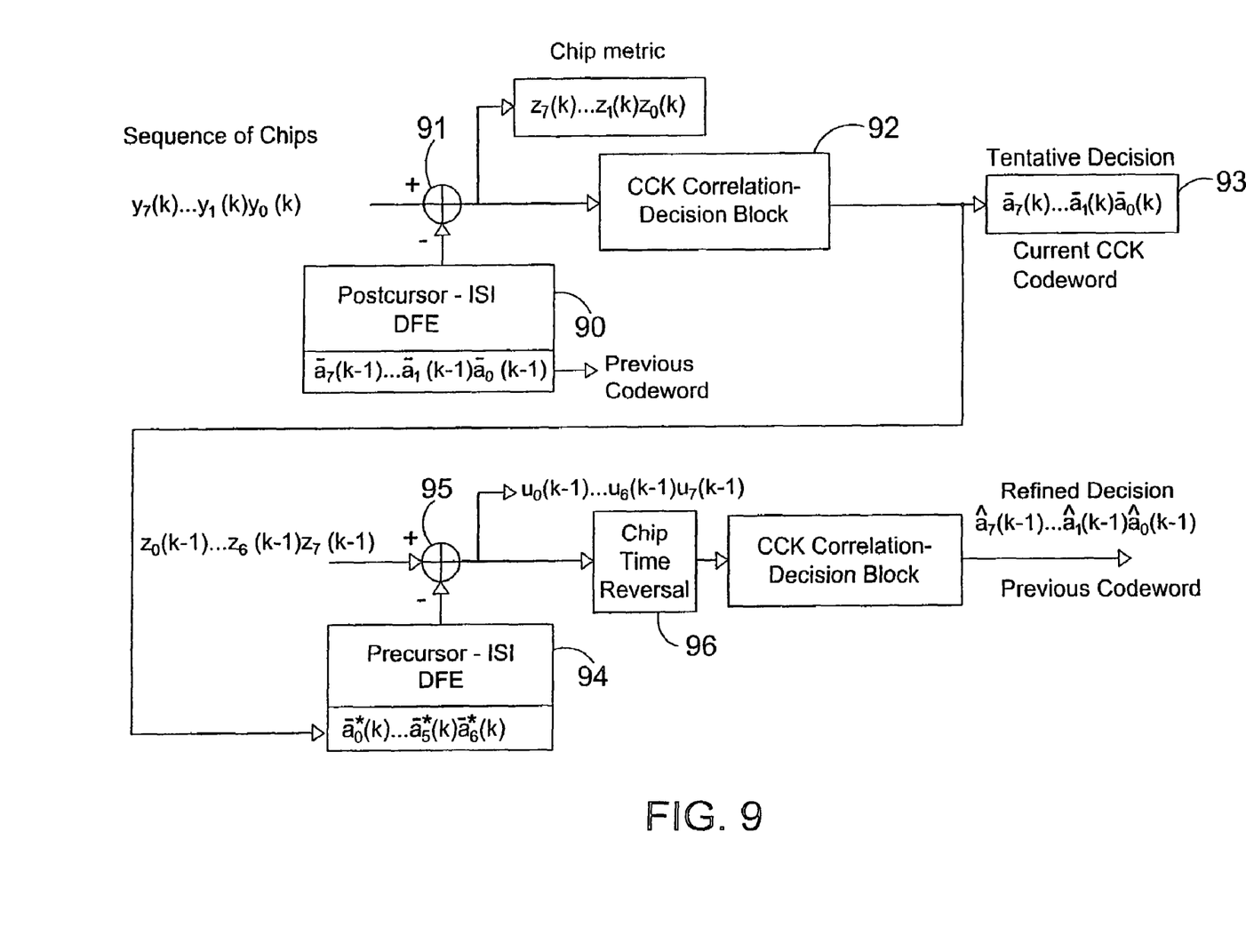
FIG. 9 is a diagram of a bidirectional turbo ISI canceller-based DSSS/CCK receiver that cancels both the postcursor-ISI and the precursor-ISI in accordance with one embodiment of the present invention, where the postcursor and precursor ISI is estimated and cancelled more accurately by iterative (or, turbo) processing.

FIG. 9 is a block diagram of a BTIC-based DSSS/CCK detector. At time k, the postcursor-ISI values $(v_0^{post}(k), v_1^{post}(k), \ldots, v_{N-1}^{post}(k))$ in Equation (11) are generated by the postcursor-ISI DFE 90 and subtracted from the N soft chips in the CMF output $(y_0(k), y_1(k), \ldots, y_{N-1}(k))$ in subtractor 91 to yield the soft metrics $(z_0(k), z_1(k), \ldots, z_{N-1}(k))$. Refer to FIG. 5.) The soft metrics are fed to the CCK correlation-decision block 92 in FIG. 1(b), which tentatively determines the kth CCK codeword $(\tilde{a}_0(k), \tilde{a}_1(k), \ldots, \tilde{a}_{N-1}(k))$ 93. Then, the conjugates of the tentative codeword chips are stored in the precursor-ISI values of the (k−1)th CCK symbol $(v_{N-1}^{pre}(k-1), v_{N-2}^{pre}(k-1), \ldots, v_0^{pre}(k-1))$. (Refer to FIG. 7.) Finally, the precuror-ISI values are subtracted in subtractor 95 from the time-reversed soft metrics that were stored at time k−1, $z_{N-1}(k-1), z_{N-2}(k-1), \ldots, z_0(k-1)$), to yield the time-reversed sequence of the refined soft metrics:

$$u_i(k-1) = z_i(k-1) - v_i^{pre}(k-1), i = N-1, N-2, \ldots 0. \quad (15)$$

Next, the metric sequence $(u_{N-1}(k-1), u_{N-2}(k-1), \ldots, u_0(k-1))$ is time-reversed in Block 96 and fed to the CCK correlation-decision block once again to produce the $(k-1)$th refined CCK codeword $(\hat{a}_0(k-1), \hat{a}_1(k-1), \ldots, \hat{a}_{N-1}(k-1))$. Note that the refined soft metric sequence is free from the precursor-ISI as well as the postcursor-ISI at the cost of one symbol-time delay unless the tentative decision is erroneous. (Refer to Equation (12) and Equation (15).)

In order to improve detection performance, we can iterate the entire processing at each symbol detection time by reloading the postcursor-ISI DFE with the refined CCK codeword chips and restarting the postcursor-ISI cancellation and then the precursor-ISI cancellation. After completing the pre-determined number of iterations at time k, the final sequences of the soft metrics $(z_0(k), z_1(k), \ldots, z_{N-1}(k))$ and the tentative-decision codeword chips $(\tilde{a}_0(k), \tilde{a}_1(k), \ldots, \tilde{a}_{N-1}(k))$ are stored in the memory for use at time k+1. The entire turbo processing is continued until all the payload CCK symbols are decoded.

Figure 10:
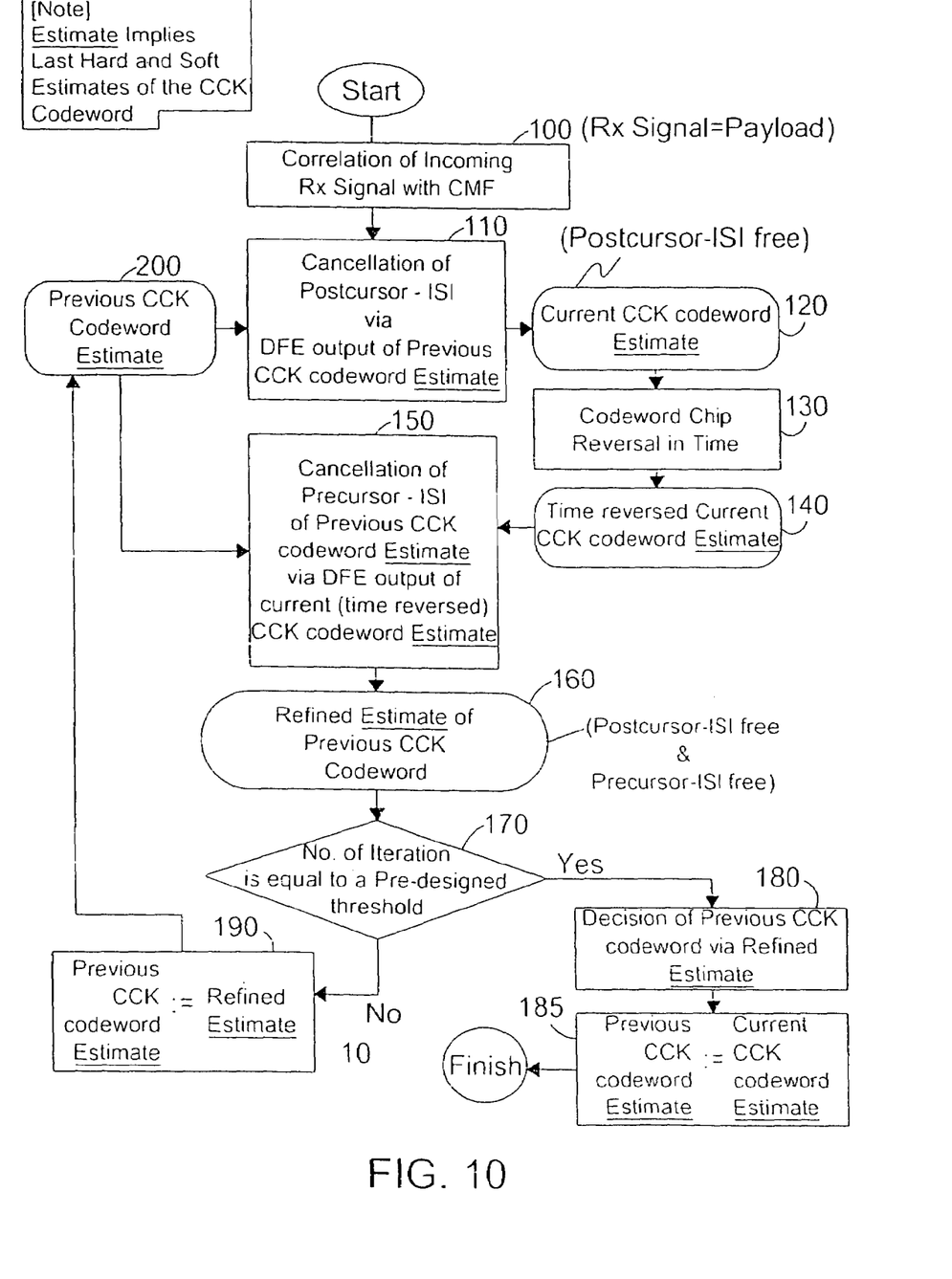
FIG. 10 is a flow chart showing steps which the bidirectional turbo ISI canceller of FIG. 9 performs based on estimates of current and previous CCK codewords.

FIG. 10 summarizes the operation of the BTIC between the estimates of the current and previous CCK codewords. At the beginning, 8 noisy chips corresponding to the current CCK codeword are obtained via the correlation between the received payload signal and the CMF. (Block 100). The postcursor-ISI is canceled from the noisy chip sequence via the procedure in FIG. 6 using the DFE output of the hard estimate of the previous CCK codeword. (Block 110). The results are stored as the hard and soft estimates of the current CCK codeword, which are ideally postcursor-ISI free. (Block 120).

The precursor-ISI is canceled from the soft estimate of the previous CCK codeword via the procedure in FIG. 8 using the DFE output of the chip-time reversed hard estimate of the current CCK codeword which was obtained in 120. (Blocks 130, 140, 150). The results are stored as the refined hard and soft estimates of the previous CCK codeword, which are ideally both postcursor-ISI free and precursor-ISI free. (Block 160).

If the number of iterations is equal to a predetermined value (Block 170), a final decision of the previous CCK codeword is made by taking the hard estimate of the previous CCK codeword obtained in Blocks 120-160. (Block 180). The hard and soft estimates of the previous codeword are then set to the current CCK codeword. (Block 185). Otherwise, the hard estimate of the previous CCK codeword is updated with the refined one (Block 190) and the process continues to Block 200.

Finally, the CCK symbol time index k is incremented by 1, and the hard and soft estimates of the previous CCK codeword are set to those of the current CCK codeword, which is a preliminary step for the next CCK codeword decision.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A method for reducing signal distortion in a receiver, comprising:
    deriving a sequence of chips from a received signal, wherein deriving the chip sequence includes convolving the received signal with coefficients of a filter;
    canceling postcursor-inter-symbol interface (ISI) from the chip sequence to determine a current code complementary keying (CCK) codeword;
    computing a chip-time reversed estimate of the current CCK codeword; and
    canceling precursor-ISI from a previous CCK codeword based on the chip-time reversed estimate of the current CCK codeword.

2. The method of claim 1, wherein deriving the chip sequence includes:
    convolving the received signal with coefficients of a channel matched filter.

3. The method of claim 1, further comprising:
    generating terms for canceling the postcursor ISI from a chip sequence detected in a preceding symbol.

4. The method of claim 1, wherein canceling postcursor-ISI includes:
    generating postcursor-ISI cancellation terms from a previously detected CCK chip sequence used to form a previous CCK codeword;
    subtracting the postcursor-ISI cancellation terms from the chip sequence to produce a chip metric; and
    determining said current CCK codeword using said chip metric.

5. The method of claim 1, wherein canceling postcursor-ISI includes:
    setting decision feedback equalizer (DFE) coefficients based on a previously detected CCK chip sequence;
    generating postcursor-ISI terms by shifting the DFE coefficients a predetermined number of times per chip clock;
    subtracting the postcursor-ISI terms from the chip sequence to produce a chip metric.

6. The method of claim 4, wherein the current CCK codeword is generated by inputting said chip metric into a CCK correlator.

7. The method of claim 1, wherein canceling the precursor-ISI includes:
    computing conjugates of chip values of a future symbol;
    setting decision feedback equalizer (DFE) coefficients based on the conjugates;
    generating precursor-ISI terms by shifting the DFE coefficients a predetermined number of times per chip clock; and
    subtracting the precursor-ISI terms from chip metrics corresponding to the previous CCK codeword.

8. The method of claim 1, wherein the received signal is one generated in a direct-sequence spread-spectrum (DSSS/CCK) wireless communications system.

9. The method of claim 1, further comprising:
    equalizing signal energy in a codeword correlator bank used to generate the current and previous CCK codewords.

10. The method of claim 1, further comprising:
    (a) obtaining chips of the previous CCK codeword generated after cancellation of the precursor-ISI; and
    (b) performing postcursor-ISI and precursor-ISI based on the previous CCK codeword chips obtained in (a).

11. The method of claim 10, further comprising:
    repeating steps (a) and (b) a predetermined number of times.

12. A system for reducing signal distortion in a receiver, comprising:
    channel matched filter which generates a sequence of chips from a received signal;
    a decision feedback equalizer (DFE) which cancels postcursor- inter-symbol interferance ISI from the chip sequence to produce a chip metric; and a code complementary keying (CCK) correlation-decision block which generates a current CCK codeword based on said chip metric, wherein the DFE cancels precursor-ISI from a previous CCK codeword based on a chip-time reversed estimate of the current CCK codeword.

13. The method of claim 12, wherein the DFE cancels postcursor-ISI by generating postcursor-ISI correction terms from a previously detected CCK chip sequence used to form the previous CCK codeword and subtracting the postcursor-ISI correction terms from the chip sequence to produce said chip metric.

14. The system of claim 12, wherein the DFE cancels postcursor-ISI by setting DFE coefficients based on a previously detected CCK chip sequence, generating postcursor-ISI terms by shifting the DFE coefficients a predetermined number of times per chip clock, and subtracting the postcursor-ISI terms from the chip sequence to produce said chip metric to produce said chip.

15. The system of claim 12, wherein the DFE cancels the precursor-ISI by computing conjugates of chip values of a future symbol, setting DFE coefficients based on the conjugates, generating precursor-ISI terms by shifting the DFE coefficients a predetermined number of times per chip clock, and subtracting the precursor-ISI terms from chip metrics corresponding to the previous CCK codeword.

16. The system of claim 12, wherein the receiver is a DSSS/CCK wireless communications receiver.

17. The system of claim 12, further comprising:
an energy bias canceler which equalizes signal energy in the codeword correlator bank.

18. A bidirectional turbo inter-symbol interface (ISI) canceler (BTIC), comprising:
a single-symbol detector which generates a sequence of chips from a received signal;
a postcursor-ISI canceler to generate postcursor-ISI cancellation terms from a previously detected chip sequence used to form a previous code complementary keying (CCK) codeword and to cancel postcursor-ISI from the chip sequence to produce a chip metric; and
a precursor-ISI canceler to generate precursor-ISI cancellation terms based on a chip-time reversed estimate of a current CCK codeword generated from said chip metric to cancel precursor-ISI from the previous CCK codeword.

19. The bidirectional turbo ISI canceler of claim 18, wherein the single-symbol detector includes a RAKE receiver.

20. The bidirectional turbo ISI canceler of claim 18, comprising:
a channel matched filter which generates the chip sequence from the received signal; and
a codeword correlator bank which generates the current CCK codeword from said representation of said postcursor-ISI.

21. The bidirectional turbo ISI canceler of claim 20, wherein the single-symbol detector further includes an energy bias canceler to equalize signal energy in the codeword correlator bank.

22. A method for reducing distortion in a receiver, comprising:
computing a set of decision feedback equalizer (DFE) coefficients;
canceling postcursor-inter-symbol interference (ISI) caused by a preceding symbol using the set of DFE coefficients; and
canceling precursor-ISI caused by a trailing symbol using the same set of DEE coefficients, wherein said canceling postcursor-ISI and the canceling precursor-ISI are respectively performed in first and second feedback canceler units based on the set of DEE coefficients, wherein canceling the precursor-ISI because of the trailing symbol comprises:
computing conjugates of chip values of a future symbol;
setting the DFE coefficients based on the DFE coefficients; and
subtracting the precursor-ISI terms from chio metrics to reduce the precursor-ISI.

23. A receiver, comprising:
a first feedback canceler to cancel postcursor-inter-symbol interference (ISI) caused by a preceding symbol;
a second canceler which cancels precursor-ISI caused by a trailing symbol, wherein the first and second cancellers use a same set of decision feedback equalizer (DFE) coefficients to cancel the postcursor-ISI and precursor-ISI, wherein the first and second feedback cancellers are included in at least one DFE, the decond feedback canceller to use the set of DFE coefficients being time-reversed to cancel the precursor-ISI.

* * * * *